United States Patent [19]
Reitz

[11] Patent Number: 5,213,713
[45] Date of Patent: May 25, 1993

[54] PROCESS OF SHAPING AN ELECTRORHEOLOGICAL SOLID

[75] Inventor: Ronald P. Reitz, Hyattsville, Md.

[73] Assignee: The United States of America as represented by the Secretary of the Navy, Washington, D.C.

[21] Appl. No.: 672,986

[22] Filed: Mar. 21, 1991

[51] Int. Cl.⁵ .................... H01B 1/20; B29C 35/00
[52] U.S. Cl. ...................... 252/500; 252/73; 252/511; 252/512; 252/518; 264/24; 264/26; 219/10.53; 219/10.81; 219/10.41
[58] Field of Search .............. 252/511, 512, 518, 74, 252/73, 78.1, 78.3, 79, 500; 204/3, 130, 164; 264/24, 26; 219/10.53, 10.81, 10.41

[56] References Cited

U.S. PATENT DOCUMENTS

| | | | |
|---|---|---|---|
| 3,289,253 | 12/1966 | Buonaiuto | 264/26 |
| 4,524,037 | 6/1985 | Marc | 264/26 |
| 4,597,922 | 7/1986 | Durbin | 264/26 |
| 4,661,299 | 4/1987 | Thorsrud | 264/26 |
| 4,707,231 | 11/1987 | Berger | 204/164 |
| 4,720,363 | 1/1988 | Mayumi et al. | 264/26 |
| 4,840,758 | 6/1989 | Thorsrud | 264/26 |
| 4,879,056 | 11/1989 | Filiske | 252/74 |
| 4,950,347 | 8/1990 | Futagawa | 219/10.53 |
| 5,082,436 | 1/1992 | Choi et al. | 264/26 |
| 5,093,546 | 3/1992 | Matsumiya et al. | 219/10.53 |

*Primary Examiner*—Paul Lieberman
*Assistant Examiner*—Bradley A. Swope
*Attorney, Agent, or Firm*—Charles D. Miller

[57] ABSTRACT

Electrorheological solids are compositions which undergo phase change from solid phase to fluid or gel phase when activated by electric field. Objects comprising electrorheological solid compositions can be electrically repaired by electrically inducing solid to fluid phase change. Furthermore, while in fluid phase, the object shape can be altered to render a new object.

5 Claims, 6 Drawing Sheets

PROCESS OF SHAPING AN ELECTRORHEOLOGICAL SOLID

The described herein may be manufactured by or for the Government of the United States without payment on any royalties thereon or therefor.

CROSS REFERENCE TO RELATED APPLICATIONS

This application is in similar art area of my copending patent applications Ser. No. 07/219,522 filed Jul. 15, 1988, Ser. No. 07/405,178 filed Sep. 11, 1989, Ser. No. 07/584,836 filed Nov. 5, 1990, now abandoned and Ser. No. 07/617,317 filed Nov. 23, 1990, all of which are incorporated herein by reference.

BACKGROUND OF THE INVENTION

Field of the Invention

This invention relates to the field of composition of materials and articles that undergo phase change when positioned in an electric field, such materials known as electrorheological materials. The invention relates particularly to electrorheological solids that can be electrically induced to become fluid and the process of electrically inducing such phase changes.

Background of the Invention

The invention disclosed herein is in a similar area of art of work previously accomplished and for which patent applications were filed on Jul. 15, 1988 as Ser. No. 07/219,522 entitled Induced Dipole Electroviscous Fluids and on Sep. 11, 1989 as Ser. No. 07/405,178 entitled Electroset Compositions and Articles and on Nov. 5, 1990 as Ser. No. 07/584,836 entitled Programmable Electroset Materials and Processes and on Nov. 23, 1990 as Ser. No. 07/617,317 entitled Electrorheological Fluid Chemical Processing, the disclosures of which are hereby incorporated by reference. In particular, my earlier copending application Ser. No. 07/219,522 disclosed electroviscous fluids and aggregates useful in electroviscous fluids. Later copending applications Ser. No. 07/405,178 and 07/584,836, now abandoned disclosed a series of compounds utilizing, in part, the aggregates disclosed in my earlier copending applications. The term aggregate is used in the collective to include a multiplicity of electrically polarizable particles, said polarizable particles comprising the particulate of electrorheological fluids. The terms electroviscous and electrorheological were used interchangably and were intended to refer to the same compositions and electrical processes affecting the physical properties of said compositions. In my copending applications, the terms electroviscous aggregate and electrorheological aggregate have been used to describe aggregate which, when placed in a dielectric fluid, causes the combination of fluid and aggregate to behave electrorheologically.

Ser. Nos. 07/405,178 and 07/584,836, now abandoned have disclosed a second group of Reitz effects, collectively known as the second Reitz effect, and are associated with the accelerated curing of electroset materials and the programming of electroset materials. It was disclosed that electroset materials are compositions comprising a multiplicity of electrorheological aggregate particles within a dielectric fluid which undergoes, at least in part, phase change from fluid to solid wherein said phase change is accelerated by application of electric current and electric voltage to said electroset composition.

It was further disclosed that these electroset compositions can be electrically programmed during their phase change to have varied and controlled end product properties. The term end product properties refers to the those properties of the electroset composition after the phase change of said composition has been accomplished.

In Ser. No. 07/617,317 entitled Electrorheological Fluid Chemical Processing it was disclosed that the electric fields applied to electrorheological fluids can be used to control chemical reactions therein. Such applications of electric fields are useful in electrically controlling the acidity (i.e. the ph) of the electrorheological fluid, controlling the solubility of substances immersed therein and controlling the rate at which a chemical reaction proceeds. It was further disclosed that an applied electric field can control the chemical reactions causing an electrorheological fluid to undergo phase change to a solid, even when said electrorheological fluid would NOT undergo a phase change from fluid to solid in absence of the applied electric field.

In all of the disclosed prior art, the rheological changes always occurred in form of a fluid changing to a solid, said solid phase being either permanent or, alternatively, persistant only with the application of an electric field to the electrorheological fluid or, alternatively, to the electroset fluid. While such prior art is both useful and advantageous, it is limited to those electrical processes that can be wrought within an appropriate composition that is fluid (i.e. not solid). Furthermore, it is limited in that, once the electroset composition has solidified, it never again enters into a fluid phase. Hence, the rheological properties of the solidified composition are no longer capable of being electrically activated or affected in any way by electric field.

SUMMARY OF THE INVENTION

The present invention provides a means whereby an initial solid composition may be electrically caused to become a fluid or gel. Removal of the electric field enables the composition to become solid again. Such compositions are, for the purposes of this disclosure, called electrorheological solids. As solids, they can support a shear stress, and can have, though need not necessarily have, mechanical properties that are often associated with elastomeric polymers or plastics. Such properties include the property of flexibility, meaning that the materials can be forcably bent and will return to their initial position when the bending force is removed. Other properties include non-zero tensile strength, non-zero tear strength, non-zero compression strength and other properties associated with solid materials. For the purposes of this disclosure, the term "non-zero" refers to any physical or mechanical quantity that is measurable by accepted laboratory methods established by the U.S. National Institute of Science and Technology.

One utility of the present invention of electrorheological solids and electrical processing thereof is found in the ability of such materials to be electrically repaired. For instance, if an electrorheological solid is damaged such that it is severed at a particular location, the material can be repaired by a two stage process. The first stage of the process is applying a suitable electric field to said location and the surrounding vicinity of said location thus causing the electrorheological solid at and near the location to become fluid or gel. The second stage is the removal of the applied electric field from said location and surrounding vicinity thus resulting in the electrorheological solid becoming solid again.

Another use of the electrorheological solids and the electrical processing thereof is in the restructuring of said electrorheological solids from an initial shape into different desired shape. For example, an electrorheological solid that is in the form of a flat strip can be made into an L shaped strip by a three stage process. The first stage is applying a suitable electric field to the strip at the location where it is intended to have a bend. This first stage causes the electrorheological solid to fluidize (i.e. become a fluid or gel). The second stage is the removal of the applied electric field and then the bending of the electrorheological strip to a 90 degree angle at said location while said location of strip is still fluidized. The third stage of the process is holding said electrorheological solid in place with said 90 degree bend therein until said electrorheological solid at the fluidized location again becomes solid.

Thus, the invention can be used as a means to electrically repair damaged electrorheological solids, such as those that may have been cut or severed by a knife, scissors or other severing means. The electrically induced fluidizing of the present invention may also be used to reshape or fashion the electrorheological solids into desirable shapes appreciably different from the initial form of said electrorheological solid. The electrical shaping means provided by the present invention can be used to make many different objects that vary significantly from the object initially formed by the electrorheological solid.

Herein, the words "application of electric field" and "applying an electric field" refers to any means whereby said electrorheological solid is immersed within an electric field. Thus, the words "application of electric field" as well as the words "applying an electric field" are used to refer to the production of an electric voltage potential across the electrorheological solid or, alternatively, are used to refer to the production of electric current, however small, through said electrorheological solid. The means of applying an electric field to an electrorheological solid is therefore similar to the means whereby an electric field can be applied to an electrorheological fluid as disclosed in my prior art patent applications Ser. No. 07/219,522; 07/405,178; 07/584,836, now abandoned the disclosure of which are hereby incorporated by reference and also taught in other prior electroviscous fluid art patents that have been issued by the U.S. Patent Office. Such other prior art U.S. patents so issued include, but are not limited to, U.S. Pat. Nos.: 4,687,589; 3,427,247; 3,970,573; 3,984,339; 4,502,973; 4,737,886.

It has been found that useful electrorheological solids can comprise a polymeric solid within which are immersed and throughout which are distributed suitable electrorheological particles. Such polymeric solids include thermoplastic solids. Such solids include but are not limited to glue sticks that are sold under product number 229/110 which are manufactured and distributed by Adhesive Technologies, Inc. located in Hampton, N.H. Such solids also include thermoplastic-toughened epoxies, bismaleimides, polyimides and polysulfones. Electrorheological particles used in electrorheological solids may comprise any electrically conductive or semiconductive material such as graphite, aluminium, copper, steel, iron and corn starch particles which have been wetted with an electrolyte solution such as ammonia in water. Useful electrorheological particles may also comprise particles which form electric dipoles when immersed within an electric field. Such particles are well known in the are and may comprise hydrophilic particles which have been wetted in an electrolytic solution such as ammonia in water, sodium chloride in water, and epsom salt in water. Such hydrophilic particles include microcellulose particles, corn starch particles, rice starch particles and silica gel particles which are all well-known in their usefulness as electrorheological particles in electrorheological fluids.

Alternatively, the electrorheological particles may comprise anhydrous, dipole-forming materials such as graphite, aluminium, and other electrically conductive particles that have been shielded with non-conductive material. Examples of such shielded particles are found in my copending application 07/219,522 entitled Induced Dipole Electroviscous Fluid. It is appreciated that any thermoplastic solids that can be made semiconductive are suitable for use in electrorheological solids and suitable for electrically processing as electrorheological solids.

The electrical fluidizing of electrorheological solids is known as the third Reitz effect. It is not known exactly why the electrorheological solids exhibit the third Reitz effect. However, it is theorized that the overall conductivity and resistivity is important to the function of such materials. The distribution of the particles throughout the polymer directs the flow of electric current passing through the electrorheological solid material. Thus, electrically conductive particles distributed throughout a semiconductive polymer can cause the electric current flow through the solid to pass through and between the particles.

The particles are therefore theorized to control the dielectric breakdown of the polymer between particles. Similarly, the distribution of induced electric dipoles that form within the polymer reduces the dielectric strength of the electrorheological solid with respect to the same polymer that has no electric dipole particles distributed throughout.

It is also theorized that an electrochemical reaction may occur within the aggregate particles that are distributed throughout the polymer. Such an electrochemical reaction, if exothermic, may produce heat which helps to heat up the thermoplastic polymer to its melting point. If such a reaction is at least partially responsible for the heating of the electrorheological solid, then an important aspect to the invention is that it provides an electrical means of controlling chemical reactions within an electrorheological composition.

For whatever the reason that they function, the electrorheological solids will fluidize when energized with sufficient electric voltage and current. The process of fluidizing (i.e. causing to become fluid) an electrorheological solid can be accomplished by positioning the electrorheological solid between two electrodes and then applying electric power to said electrodes which causes an electric voltage and current to exist within the electrorheological solid between electrodes. Such electrodes may comprise and electrically conductive material such as aluminum, steel, copper, bronze and zinc. Alternatively, such electrodes may comprise semiconductive materials such as germanium or silicon that are P or alternatively N doped semiconductors commonly used in electronic transitors. The electrodes may be energized (i.e. electrically charged) by connecting said electrodes electrically to a high voltage power supply. Thus, electrorheological solids are electrically energized in same manner that electroset materials and electrorheological fluids are energized electrically. Teachings concerning the electrical energizing of electroset materials and electrorheological fluids may be found in my prior art patent applications referred to in the background section of this patent disclosure.

Again, it should be emphasized that the means of energizing the electrorheological solids and electroset materials are the same, said means comprising the charging of electrodes while the electrorheological solid or, alternatively, the electroset material is positioned between said electrodes. The important difference between electrically energizing an electrorheological solid and electrically energizing an electroset material is in the effect of energizing. In the case of electrorheological solids, the electrically induced phase change occurs from solid phase to fluid or gel phase. In the case of electroset materials, the effect is to accelerate the phase change from fluid phase to solid phase.

Electrorheological solids have an advantage over electroset materials in that electrorheological solids can repeatedly be electrically induced to undergo phase change. Electroset materials, once cured, are not known to have repeatably electrically accelerated set and cure rates.

For this reason, articles consisting of electrorheological solid compositions have the advantage of being formed into a specific shape, used for a period of time and then, afterward, being reshaped into a different specific shape in order to be useful in some some new capacity.

Electrorheological solids made in accordance with the present invention are useful for fabricating tools and objects of diverse kinds, the novelty of such articles and tools being in the manner such articles and tools can be electrically repaired and also such novelty being in the manner in which such articles and tools can be reshaped into different articles and tools. For example, an electrorheological solid may be initially fabricated and shaped in the form of a strap tie. An illustration of a strap tie can be found in the Visual Handbook of Build and Remodeling authored by Charlie Wing and published by Rodale Press of Emmaus, Pa. under a 1990 copyright.

After using the object in the form of a strap tie, a section of the object may be subjected to an appropriate electric field to fluidize the midsection of the object. While in the fluid or gel state, the strap tie can be bent at the fluidized midsection into a corner brace by bending it such that it has a 90 degree angle bend. With the electric field removed, the object can be held by hand in the shape of the corner brace until the fluidized area has solidified. The shape of the corner brace thus made is similar to the shape of metal corner braces manufactured by Stanley Hardware of New Britain, Conn. and sold under reorder number 75-6104.

Later, the corner brace can be reshaped again into the form of a mirror holder or some other useful item such as a solid material in the shape of an alphabetic letter that can be used in a sign or nameplate for a building.

It is therefore possible to form objects and then reshape them into different forms in accordance with the present invention.

It is an object of the invention to provide material compositions which undergo phase change from solid to fluid when the composition in under the influence of an electric field.

It is another object of the invention to provide material compositions which can be repaired when the composition is under the influence of an electric field.

It is also an object of the invention to provide material compositions which can alter shape while under the influence of an electric field.

It is yet another object of the invention to provide a method of electrically repairing damaged electrorheological solid compositions.

It is also yet another object of the invention to provide a method for electric control of the phase change of electrorheological solid compositions.

It is still yet another object of the invention to provide a method and material for making molded articles.

The advantages of the compositions and methods will be readily understood by those skilled in the art in light of this disclosure. While it is known that many materials may undergo phase change from solid to fluid phase while the materials are being heated by external heat sources, many of these materials are poor conductors of heat and therefore heat unevenly and slowly. The present invention provides a means for controlling and localizing the area of a thermoplastic material that undergoes phase change from solid to fluid phase. It also provides a means for doing so rapidly.

Another advantage of the invention is that it provides an alternate means for the molding of objects. Altering the shape of an object by electrifying only a portion of said object can save energy when compared to the methods that require the entire object to be melted and poured into a mold.

Another advantage of the present invention is that it provides a means whereby a material may be repaired electrically which overcomes the objection to repairing thermoplastic material by providing a heating mechanism to melt said material. The present invention also provides for the clean repair of damaged polymers as opposed to the messy conventional method of applying glue to the damage site, said glue often having to be mixed or melted prior to application.

These and other objects, advantages and features of this invention will become apparent from the following detailed description of the invention when considered in conjunction with the accompanying drawings.

DETAILED DESCRIPTION OF THE INVENTION

Figure 1:
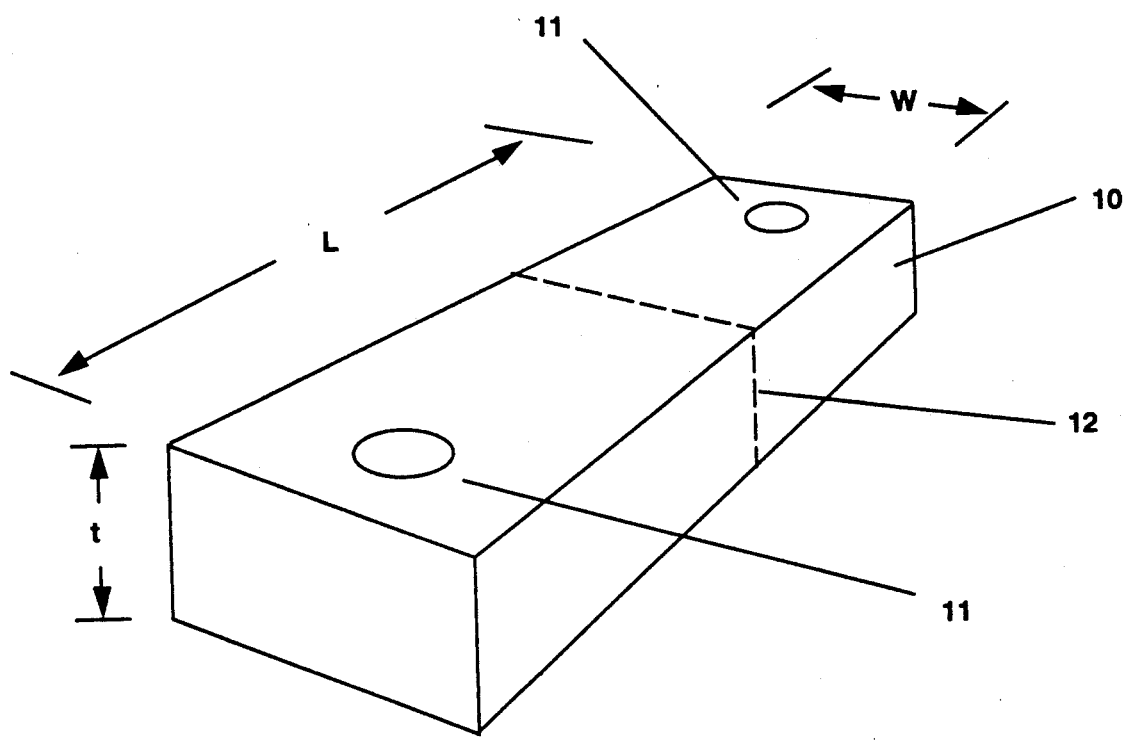
FIG. 1 is a perspective view of a strap tie.

In general, any polymeric material that exhibits plastic properties when heated to temperatures above room temperature is a vehicle is that is considered suitable for use as phase changing vehicles in electrorheological solids. Such materials include but are not limited to wax, nylon, polyimide, polysulfone, thermoplastic-toughened epoxy and hot gun glue sticks. Such glue sticks are suitable for use in a Thermogrip Hot Glue Gun model 203 which is an all-purpose hot melt adhesive dispenser manufactured by the Home Products Division of Emhart Consumer Group located in Reading, Pennsylvania. Such glue sticks for said hot glue gun include, but are not limited to, glue sticks known as product number 229/110 sold under the Ad-Tech Brand name and manufactured by Adhesive Technologies Inc. located on 3 Merrill Industrial Drive in Hampton, N.H. Materials that do not exhibit plastic properties when heated to elevated temperatures such as concrete, talc, brick and chalk are not expected to be good phase changing vehicles in electrorheological solids.

Shapes of various forms are formed using materials of the present invention. The shapes are formed by heating the thermoplastic phase changing vehicle to a temperature where it becomes fluid, mixing the electrorheological particles and additives therein, and then pouring these materials, which are the materials of the present invention, into a mold or onto a surface where it is shaped and then permitted to cool down and solidify. The solids thus formed can be fluidized (i.e. caused to become fluid or gel) by applying an electric field to the solid in much the same manner as an electric field is applied to an electroviscous fluid to cause the fluid to solidify. Set out below are examples of embodiments of the present invention.

EXAMPLE 1

Fabrication of Samples

An electrorheological aggregate mix (i.e. particles and substances mixed together ) was made by mixing 5 ml aluminum powder, 40 ml epsom salt, 5 ml epoxy hardner and 3 ml sudsy Ammonia. The aluminum powder is sold under the West System product number 420 manufactured by Gougeon Brothers, Inc. located in Bay City, Mich. The epsom salt is sold under the Swan brand name and distributed by Cumberland-Swan, Inc. located in Smyrna, Tenn. The epoxy hardner is sold as the hardner portion of a two part epoxy known as Tru-Bond 2-Ton Epoxy which is sold by True Value Hardware Stores located in Chicago, Ill. The sudsy ammonia is sold under the Giant Brand name and distributed by Giant Food Inc. located in Landover, Md.

Several sticks of hot melt glue were placed in a metal can and heated in a toaster oven to a heat of 375 degrees F. The glue sticks are sold as product number 229/110 manufactured and distributed by Adhesive Technologies, Inc. located in Hampton, N.H. The toaster oven used was model no. TR2OTY2 manufactured and sold by Black and Decker, Inc. located in Shelton, Conn. It is appreciated that many other toaster ovens and many other heating means may be employed to heat the thermoplastic material which comprises the hot melt glue sticks.

After heating for 25 minutes, it was observed that the hot melt glue was a fluid. A quantity of 20 ml of the aggregate mix was mixed with 40 ml of the hot melt glue fluid. Afterward, the mixture was poured onto a flat metal sheet and cooled to room temperature. The mixture formed a flat sheet of electrorheological solid when cooled to room temperature. The flat sheet of electrorheological solid was found to be approximately 3/16 inches in thickness. This flat sheet was then cut into samples having approximately the dimensions 3 inch × ½ inch × 3/16 inch.

ELECTRICAL PROCESSING OF SAMPLES

Samples made in accordance with the procedure in example 1 were tested for their utility in repair of electrorheological solids and also for their reshaping utility. Referring to FIG. 1, a first strap tie 10 was made by drilling ⅛ inch holes 11 through a sample made in accordance with the procedure in example 1. Holes 11 are located near the opposite ends of strap tie 10 as shown in FIG. 1. Holes 11 were made using a hand drill fitted with a ⅛ inch drill bit. The dimensions of the strap tie were 3 inches in the length L, ½ inches in width W and 3/16 inches in thickness t, said dimensions being marked as shown in FIG. 1.

Strap tie 10 was placed over a 1 inch wide, ½ inch thick, 1 inch long wooden block (not shown) and was secured into position by inserting screws (not shown) through holes 11 and into a wooden table top under said wooden block. The wooden block had been glued using 5 minute epoxy to the table surface. Strap tie 10 was usefully employed to secure the block firmly into position until the glue dried.

After 10 minutes, the strap tie 10 was unsecured from the table by removing the securing screws. A cut 12 was then made by handsaw along the midsection of strap tie 10 as shown in FIG. 1. Said cut 12 severed strap tie 10 along cut line 12.

Figure 2:
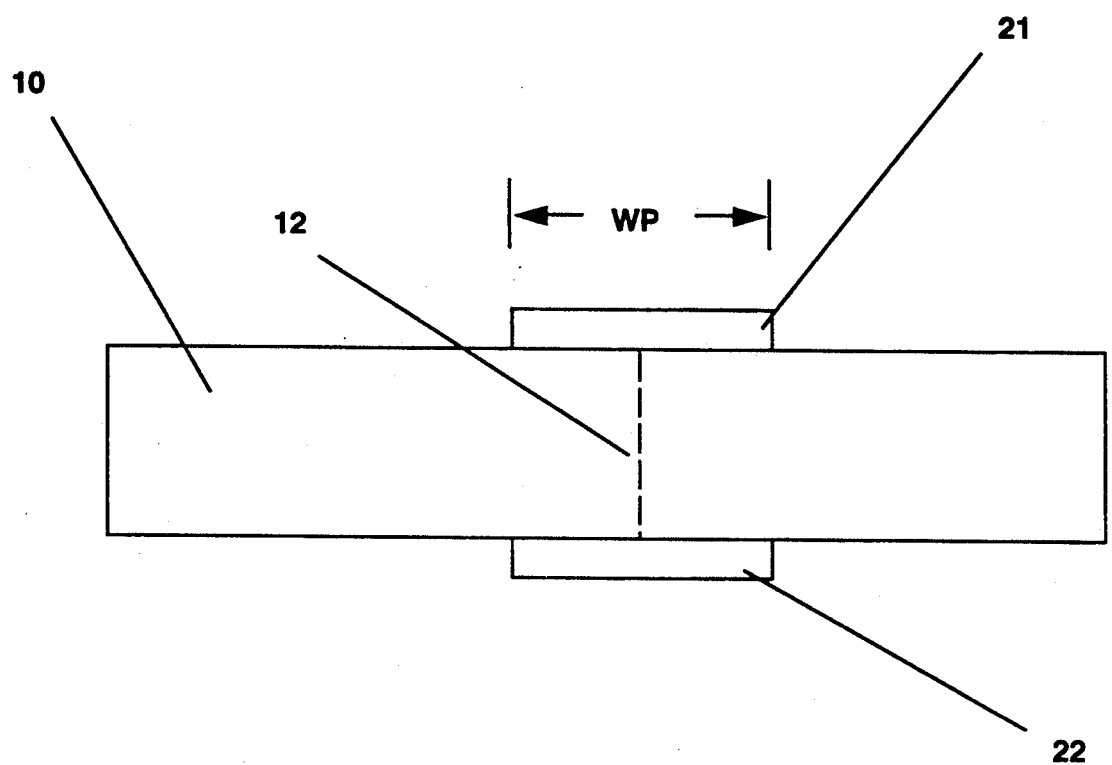
FIG. 2 is a side elevation view of the strap tie shown in FIG. 1 which has been severed in its midsection and inserted between two oppositely charged electrodes.
Figure 3:
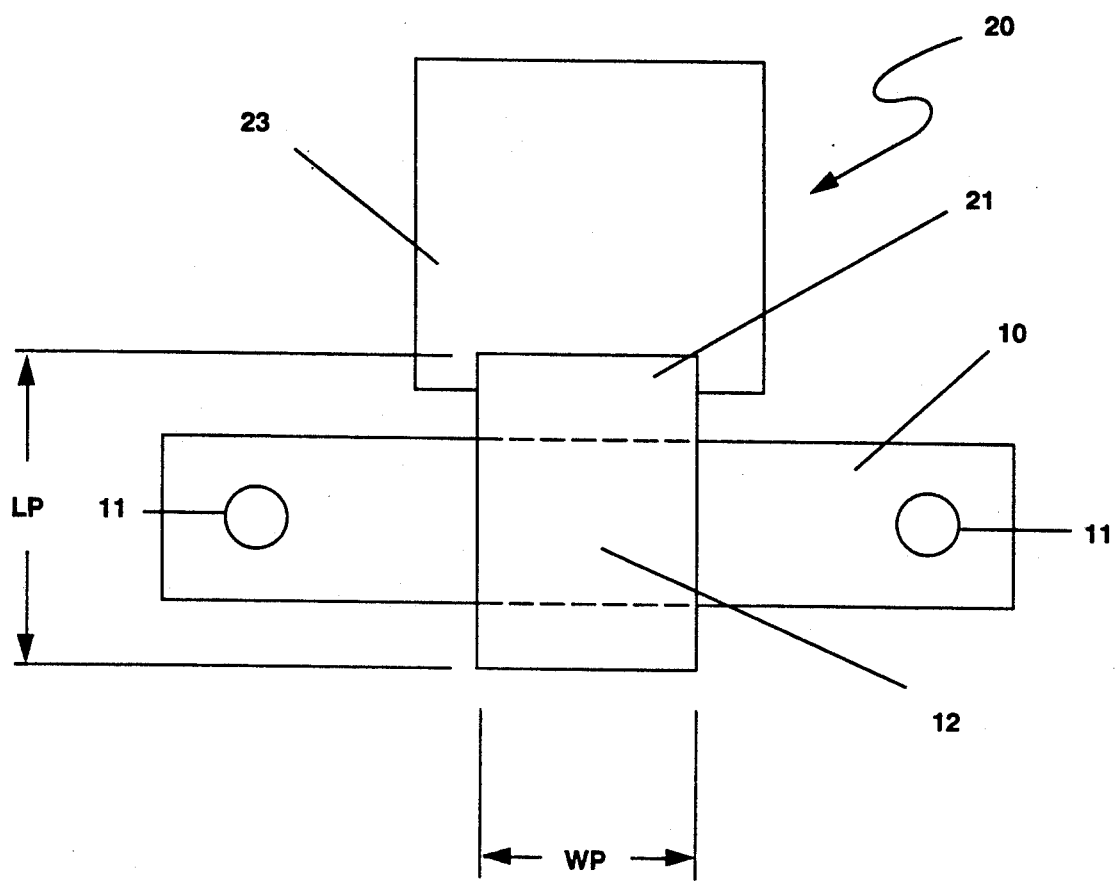
FIG. 3 is a top view of the strap tie and electrodes shown in FIG. 2.

As shown in FIGS. 2 and 3, the midsection of the strap tie 10 along the line of cut 12 was positioned between two electrodes 21 and 22 of a probe 20. The length LP and width WP of each of the electrodes 21 and 22 were ¾ inch and ½ inch, respectively. The construction of said probe 20 comprising electrodes 21 and 22 with a spacing gap of about 3/16 inches was similar to that of the probe used in example 1 of my copending application 07/219,522 the disclosure of which is hereby incorporated by reference. Electrodes 21 and 22 were secured by means of electrical tape to opposite sides of a 3/16 inch thick wooden spacer 23, shown in FIG. 3. A Glassman 30 kilovolt (kv), 50 milliamp (ma) high voltage power supply, Model PS/PH030P050, Ser. No. 149470 Master/slave/ AHV was electrically connected to the probe 20 and used to energize the electrorheological solid sample 10. The procedure of energizing the probe is disclosed in my copending patent application 07/584,836, now abandoned entitled Programmable Electroset Materials and Processes which is hereby incorporated by reference. The procedure for electrorheologically repairing the electrorheological solids of example 1 is as follows:

With sample 10 positioned between the electrodes 21 and 22 as shown in FIGS. 2 and 3, the probe 20 was energized with the power supply setting at a maximum applied voltage and maximum applied current of 2 kilovolts (kv) and 5 milliamps (ma), respectively. The probe 20 was energized for a period of about 60 seconds. It was observed during the time of energization of probe 20 that sample 10 within the probe 20 electrodes had fluidized and that the fluid or gel from the two halves had flowed together at the cut line 12, thus making said cut line 12 disappear. Afterward, the electric power to the probe was removed and the sample 10 permitted to cool for a period of ten minutes. After cooling for the 10 minutes sample 10 was removed from between the probe electrodes 21 and 22. Sample 10 was observed to be one piece and was no longer severed along cut line 12. It was therefore observed that the strap tie had been electrically repaired by electrically fluidizing the electrorheological solid in in a suitable electric field.

Figure 4:
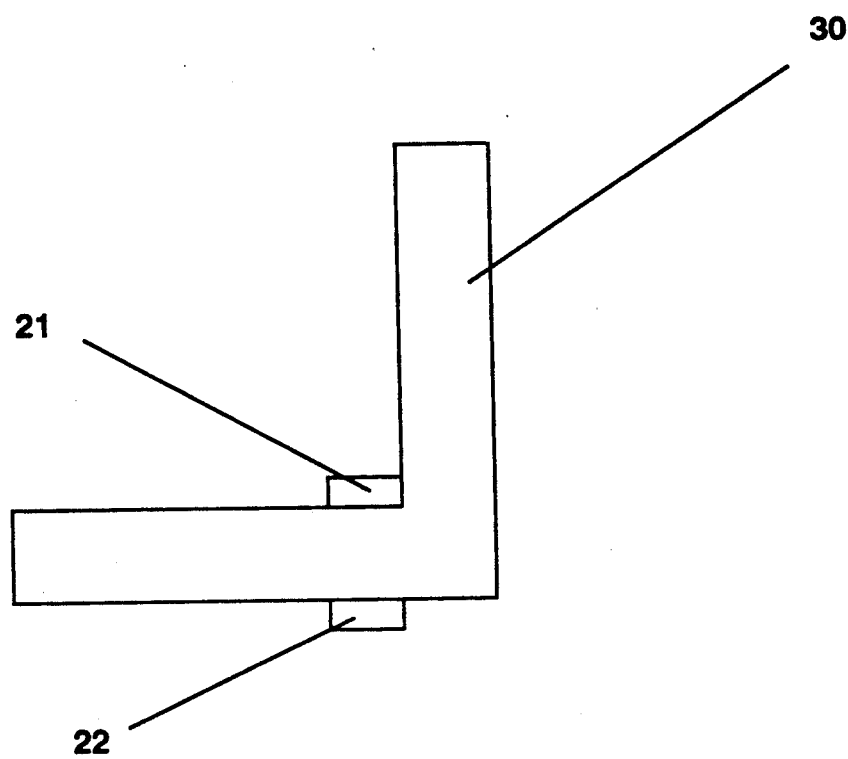
FIG. 4 is a side elevation view of a corner brace.

After observing that the strap tie 10 had electrically been repaired the strap tie 10, (without cut line 12 this time) was again positioned in probe 20 as shown in FIG. 2. such that the midsection of the strap tie 10 could again be electrically fluidized into a fluid or gel phase. The probe 20 was energized with an applied maximum voltage of 2 kilovolts and an applied maximum current of 5 milliamps. The probe 20 was energized for 2 minutes. Afterward, the electric power to probe 20 was removed. Immediately thereafter, the strap tie 10 was bent, by hand (not shown) to about a right angle at its midsection, thus transforming it from strap tie 10 into corner brace 30 which is shown in FIG. 4. The sample was held in this position for about 10 minutes, until the sample had solidified again. The resulting shape of the corner brace 30 was found to be similar to the shape of commonly available metal corner braces manufactured by Stanley Hardware of New Britain, Conn. and sold under reorder number 75-6104.

Figure 5:
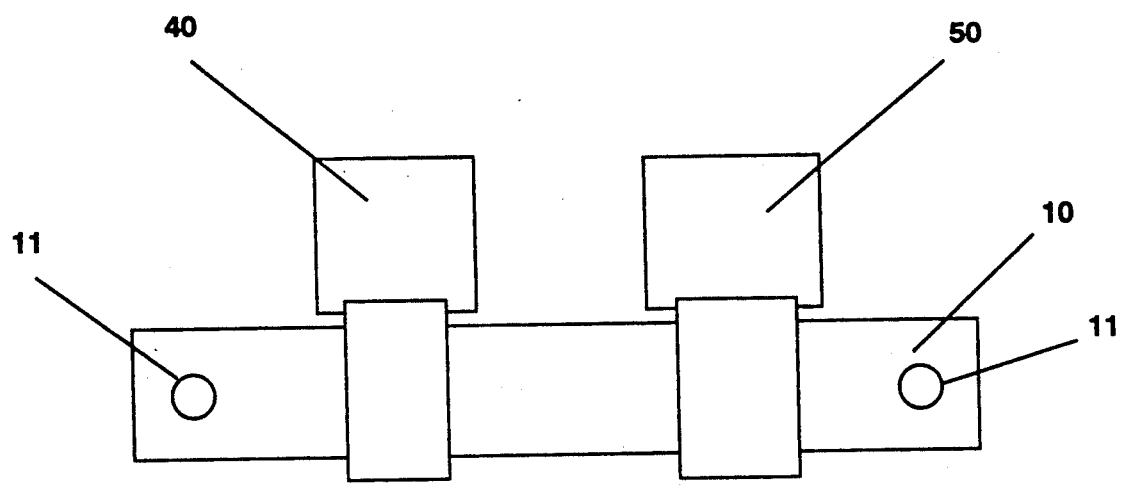
FIG. 5 is a top view of a strap tie that is ready to be transformed into the shape of an alphabetic letter.

Referring to FIG. 1 again, a second strap tie 10 was made by making a 3 inch×½ inch×3/16 inch sample in accordance with the fabrication procedure in example 1 and then drilling ⅛ inch holes 11 into opposite ends of the sample with a hand drill. Referring now to FIG. 5, two probes 40 and 50 of approximately the same dimensions and construction as probe 20 of FIG. 3 were each positioned approximately 1 inch away from the ends of the strap tie 10 as shown in FIG. 5.

Figure 6:
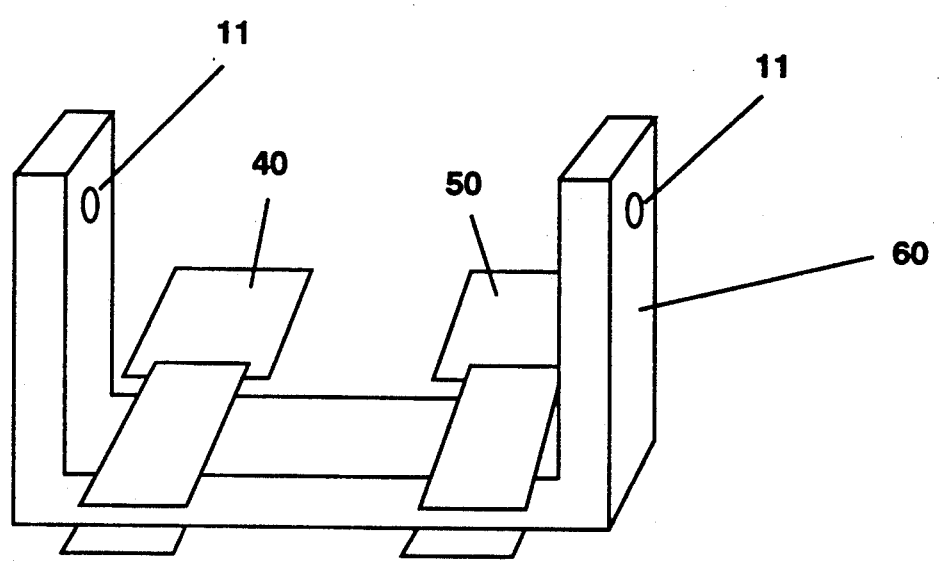
FIG. 6 is a perspective view of an alphabetic letter formed from a strap tie.

Each of the probes 40 and 50 were energized for approximately 2 minutes with a maximum applied voltage of 2 kilovolts and a maximum applied current of 5 milliamps. After about 2 minutes the electric power to the probes 40 and 50 was removed. The sample was then bent, by hand (not shown), at 90 degree angles at the probe positions, thus tranforming strap tie 10 into the alphabetic letter 60 known in the English language as the letter U as shown in FIG. 6. Alphabetic letter 60 was held in that position for 10 minutes until the it had resolidified. Probes 40 and 50 were then removed, and it was found that letter 60 could be mounted onto a structure by screws penetrating holes 11.

EXAMPLE 2

Fabrication of Samples

An electrorheological aggregate mix was made by mixing 20 ml microcrystalline cellulose, 5 ml TruBond 2-Ton epoxy hardner and 5 ml Giant brand sudsy ammonia. The microcrystalline cellulose particles are sold under the product name PH 105 by the FMC Corp. of Philadelphia, Pa.

In a similar manner as in example 1, 40 ml of hot melt glue was heated to a temperature of 375 degrees F. After 20 minutes, it was observed that the hot melt glue was fluid. A 25 ml quantity of the aggregate mix was then mixed with the 40 ml of hot melt glue. This mixture was then poured onto a flat metal surface which formed a flat sheet of electrorheological solid when cooled to room temperature. The flat sheet of electrorheological solid was found to be approximately 3/16 inches in thickness. This flat sheet was then cut into samples having approximately the dimensions 3 inch×½ inch×3/16 inch.

PROCESSING OF SAMPLES

In a manner similar to that of example 1, a sample from example 2 was made into a strap tie, utilized to hold a wooden block in position, removed from utility as a strap tie and then afterward severed along cut line 12, and then positioned between the electrodes 21 and 22 of probe 20. The probe 20 was energized with the power supply setting at a maximum applied voltage and maximum applied current of 4 kilovolts (kv) and 5 milliamps (ma), respectively. The probe 20 was energized for a period of about 2 minutes.

Afterward, the electric power to the probe was removed and the sample 10 was permitted to cool for a period of ten minutes. After cooling for the 10 minutes sample 10 was removed from between the probe electrodes 21 and 22. Sample 10 was observed to be one piece and was no longer severed along cut line 12. In a manner similar to that in example 1, the strap tie 10 was transformed into corner brace 30 by positioning it (this time without cut line 12) in probe 20 as shown in FIG. 2. such that the midsection of the strap tie 10 could again be electrically fluidized into a fluid or gel phase. The probe 20 was energized with an applied maximum voltage of 4 kilovolts and an applied maximum current of 10 milliamps. The probe 20 was energized for 30 seconds. Afterward, the electric power to probe 20 was removed. Immediately thereafter, the strap tie 10 was bent, by hand (not shown) to a 90 degree angle at its midsection, thus transforming it from strap tie 10 into corner brace 30 shown in FIG. 4. The sample was held in this position for about 10 minutes, until the sample had resolidified. The resulting shape of the corner brace 30 was found to be similar to the shape of metal corner braces manufactured by Stanley Hardware of New Britain, Conn. and sold under catalog reorder number 75-6104.

EXAMPLE 3

Fabrication of Samples

An electrorheological aggregate mix was made by mixing 35 ml graphite powder, 5 ml mineral spirits, and 10 ml mineral oil. The graphite powder is sold under the West System product number 423 manufactured by Gougeon Brothers, Inc. located in Bay City, Mich. The mineral oil is sold under the Giant brand name and is distributed by Giant Food Inc. located in Landover, Md. The mineral spirits is sold as paint thinner product number 2025 distributed by the Parks Corporation of Somerset, Mass.

In a similar manner as in example 1, 40 ml of hot melt glue was heated to a temperature of 375 degrees F. After 20 minutes, it was observed that the hot melt glue was fluid. The entire quantity of aggregate mix was then mixed with the 40 ml of hot melt glue. This mixture was then poured onto a flat metal surface which formed a flat sheet of electrorheological solid when cooled to room temperature. The flat sheet of electrorheological solid was found to be approximately 3/16 inches in thickness. This flat sheet was then cut into samples having approximately the dimensions 3 inch×½ inch×3/16 inch.

PROCESSING OF SAMPLES

In a manner similar to that of example 1, a sample from example 2 was made into a strap tie, utilized to hold a wooden block in position, removed from utility as a strap tie and then afterward severed along cut line 12, and then positioned between the electrodes 21 and 22 of probe 20. The probe 20 was energized with the power supply setting at a maximum applied voltage and maximum applied current of 3 kilovolts (kv) and 12 milliamps (ma), respectively. The probe 20 was energized for a period of about 3 minutes.

Afterward, the electric power to the probe was removed and the sample 10 was permitted to cool for a period of ten minutes. After cooling for the 10 minutes sample 10 was removed from between the probe electrodes 21 and 22. Sample 10 was observed to be one piece and was no longer severed along cut line 12.

It is appreciated that many objects comprising electrorheological solids other than those objects discussed in this disclosure can be made and later reshaped into other shaped objects, in general. The scope of this invention is not limited to objects made in the form of strap ties and corner braces. The shape of these objects were merely used to demonstrate the reshapable capability of electrorheological solids.

In light of this disclosure, those skilled in the art will appreciated that because electrorheological solids comprise a phase changing vehicle and electrically polarizable aggregate and because electrorheological solids undergo phase change from solid phase to fluid phase when under the influence of an electric field, many objects comprising electrorheological solids can be shaped into the form of useful tools and articles in general. Furthermore, it will be appreciated by those skilled in the are that electrorheological solids can be repaired electrically through a repair process comprising first, the positioning of the electrorheological solid between at least two electrically conductive surfaces and second, the electrical charging of said conductive surfaces. Still further, it will be appreciated by those skilled in the art that objects comprising electrorheological solids can also be shaped by the process comprising first, the positioning of the electrorheological solid between at least two electrically conductive surfaces and second, the electrical charging of said conductive surfaces.

Those skilled in the art will appreciate that apparatus for repairing electrorheological solids and for reshaping electrorheological solids comprises a first electrode means, a second electrode means spaced from said first electrode means, means for positioning the electrorheological solid between said first and second electrode means and means for applying an electric field between said first and second electrode means.

It will be appreciated by those skilled in the art in light of this disclosure that many other kinds of electrorheological compositions can be used without departing from the scope of the present invention. Further it will be realized that many other forms of shapes may be made by practicing the principles of this invention. It is to be understood that the embodiments herein described are only illustrative of the application of the principles of the invention and that numerous modifications, alternative embodiments and arrangements may be readily devised by those skilled in the art in the light of this disclosure without departing from the spirit and scope of the invention. It is therefore to be understood that within the scope of the appended claims, the invention may be practiced otherwise than as specifically described herein.

What is claimed is:

1. A process for shaping electrorheological solid articles, said process comprising:
    positioning an electrorheological solid comprising a mixture of thermoplastic phase changing vehicle and electrically polarizable aggregate between at least two electrically conductive surfaces, said electrorheological solid having solid to fluid phase changing means responsive to the passing of an electric current through said electrorheological solid;
    passing an electric current through said electrorheological solid such that said electrorheological solid becomes a fluid or gel;
    removing said electric current;
    forming said fluid or gel into the desired shape; and,
    allowing said fluid or gel to resolidify to form a solid article.

2. A process as claimed in claim 1 wherein said passing of electric current causes said electrorheological solid to undergo phase change from solid phase to fluid phase.

3. A process for shaping electrorheological solid articles, said process comprising:
    positioning an electrorheological solid comprising a mixture of thermoplastic phase changing vehicle and electrically polarizable aggregate between at least two electrically conductive surfaces, said electrorheological solid having solid to fluid phase changing means responsive to direct current voltage;
    electrically charging said conductive surfaces with a direct current voltage such that said electrorheological solid becomes a fluid or gel
    forming said fluid or gel into the desired shape;
    removing said electric current; and,
    allowing said fluid or gel to resolidify to form a solid article.

4. A process as claimed in claim 3 wherein said charging with direct current voltage causes said electrorheological solid undergoing phase change from solid phase to fluid phase.

5. A process comprising:
    providing means for positioning an electrorheological solid comprising a mixture of thermoplastic phase changing vehicle and electrically polarizable aggregate between at least two electrodes,
    providing means for causing said solid to become fluid said means for causing including means for applying a direct current to said solid;
    applying a direct current to said solid such that said solid becomes fluid;
    removing said electric current;
    forming said fluid into the desired shape; and,
    allowing said fluid to resolidify to form a solid article.

* * * * *